US012700811B2

(12) United States Patent
Zhang et al.

(10) Patent No.: US 12,700,811 B2
(45) Date of Patent: Aug. 4, 2026

(54) POWER CONVERTER AND METHOD FOR CONTROLLING SAME

(71) Applicant: Huawei Digital Power Technologies Co., Ltd., Shenzhen (CN)

(72) Inventors: Hejun Zhang, Shenzhen (CN); Maoyong Lu, Shenzhen (CN); Yuqiao Hu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 18/623,380

(22) Filed: Apr. 1, 2024

(65) Prior Publication Data

US 2024/0250618 A1     Jul. 25, 2024

Related U.S. Application Data

(63) Continuation of application No. PCT/CN2023/125115, filed on Oct. 18, 2023.

(30) Foreign Application Priority Data

Oct. 29, 2022     (CN) .......................... 202211340732.6

(51) Int. Cl.
*H02M 7/538* (2007.01)
*H02M 1/00* (2006.01)
*H02M 7/5387* (2007.01)

(52) U.S. Cl.
CPC ..... *H02M 7/53871* (2013.01); *H02M 1/0009* (2021.05); *H02M 1/0064* (2021.05)

(58) Field of Classification Search
CPC ........... H02M 7/53871; H02M 1/0009; H02M 1/0064
See application file for complete search history.

(56) References Cited

U.S. PATENT DOCUMENTS

| | | | | |
|---|---|---|---|---|
| 6,295,215 B1 * | 9/2001 | Faria | ........................ | H02J 9/062 |
| | | | | 363/124 |
| 7,948,778 B2 * | 5/2011 | Pfitzer | .................... | G01R 31/40 |
| | | | | 363/34 |

(Continued)

FOREIGN PATENT DOCUMENTS

| | | |
|---|---|---|
| CN | 103078485 A | 5/2013 |
| CN | 203761123 U | 8/2014 |

(Continued)

OTHER PUBLICATIONS

S. J. Chiang et al, "Design and implementation of a single phase three-arms rectifier inverter." Sep. 8, 2000, 6 pages.

(Continued)

*Primary Examiner* — Rafael O De Leon Domenech
(74) *Attorney, Agent, or Firm* — Conley Rose, P.C.

(57) ABSTRACT

A power converter includes an output inductor, an output capacitor, a first current sampling circuit, a first-phase bridge arm, a second-phase bridge arm, a third-phase bridge arm, and a controller. A midpoint of the first-phase bridge arm is coupled to a first input end of the power converter. A midpoint of the second-phase bridge arm is coupled to a first end of the output capacitor and a second input end of the power converter. A midpoint of the third-phase bridge arm is coupled to a second end of the output capacitor through the output inductor. The first end is coupled to a second output end of the power converter. The second end is coupled to a first output end of the power converter.

20 Claims, 11 Drawing Sheets

(56)          References Cited

U.S. PATENT DOCUMENTS

| | | | | |
|---|---|---|---|---|
| 9,627,999 | B2* | 4/2017 | Yamada | H02P 4/00 |
| 2004/0085785 | A1* | 5/2004 | Taimela | H02M 1/4258 |
| | | | | 363/37 |
| 2007/0008741 | A1* | 1/2007 | Al-Khayat | H02P 9/02 |
| | | | | 363/16 |
| 2020/0204081 | A1 | 6/2020 | Backman et al. | |
| 2021/0109583 | A1* | 4/2021 | Lin | H02J 9/068 |
| 2024/0250618 | A1 | 7/2024 | Zhang et al. | |

FOREIGN PATENT DOCUMENTS

| | | | |
|---|---|---|---|
| CN | 106059376 A | 10/2016 |
| CN | 106655470 A | 5/2017 |
| CN | 111416528 A | 7/2020 |
| CN | 111478408 A | 7/2020 |
| CN | 114172385 A | 3/2022 |
| CN | 115765389 A | 3/2023 |

OTHER PUBLICATIONS

S. J. Chiang et al, "Parallel operation of series-connected PWM voltage regulators without control interconnection." Mar. 13, 2001, total 7 pages.

* cited by examiner

POWER CONVERTER AND METHOD FOR CONTROLLING SAME

CROSS-REFERENCE TO RELATED APPLICATIONS

This is a continuation of International Patent Application No. PCT/CN2023/125115 filed on Oct. 18, 2023, which claims priority to Chinese Patent Application No. 202211340732.6 filed on Oct. 29, 2022. The disclosures of the aforementioned applications are hereby incorporated by reference in their entireties.

TECHNICAL FIELD

This application relates to the field of power supply technologies, and in particular, to a power converter and a method for controlling same.

BACKGROUND

Inverters mainly use a circuit structure shown in FIG. 1. As shown in FIG. 1, the inverter includes an input filter inductor L1, an input filter capacitor C1, an output filter inductor L2, an output filter capacitor C2, a bus capacitor C3, and a three-phase bridge arm formed by switching transistors Q11, Q12, Q21, Q22, Q31, and Q32. Additionally, the inverter is further provided with an inductive current sampling circuit (Hall Cs1) and an output current sampling circuit (Hall Cs2). When the inverter works, the inverter obtains an inductive current of the output filter inductor L2 and an output current of the inverter through collection performed by Hall Cs1 and Hall Cs2 respectively, and controls the six switching transistors in the three-phase bridge arm based on the collected inductive current and output current, to supply power to an alternating-current load. In the inverter, the inductive current of the output filter inductor L2 and the output current of the inverter respectively are collected by the two current sampling circuits. This manner results in high circuit costs and a large printed circuit board (PCB) area of the inverter.

SUMMARY

This application provides a power converter and a method for controlling same, to reduce circuit costs of the power converter and a PCB area of the power converter.

According to a first aspect, this application provides a power converter. The power converter includes an output inductor, an output capacitor, a first current sampling circuit, a first-phase bridge arm, a second-phase bridge arm, a third-phase bridge arm, and a controller. The first-phase bridge arm, the second-phase bridge arm, and the third-phase bridge arm are connected in parallel to each other. A midpoint of the first-phase bridge arm is connected to a first input end of the power converter. A midpoint of the second-phase bridge arm is connected to one end of the output capacitor and a second input end of the power converter. A midpoint of the third-phase bridge arm is connected to the other end of the output capacitor through the output inductor. The one end and the other end of the output capacitor are connected to a second output end and a first output end of the power converter respectively. Both the second input end and the second output end of the power converter are connected to a neutral line. The first current sampling circuit is disposed on a connection line between the midpoint of the second-phase bridge arm and the one end of the output capacitor, and is configured to collect an inductive current of the output inductor. The controller is configured to obtain the inductive current of the output inductor, and obtain an output current of the power converter based on the inductive current. Therefore, the power converter may obtain the inductive current of the output inductor and the output current of the power converter through the first current sampling circuit. As a result, one current sampling circuit for collecting the output current can be saved, to reduce circuit costs of the power converter and a PCB area of the power converter.

With reference to the first aspect, in a first possible implementation, the first current sampling circuit includes a primary winding, a secondary winding, and an iron core. One end and the other end of the primary winding are connected to the midpoint of the second-phase bridge arm and the one end of the output capacitor respectively. Both the primary winding and the secondary winding are coupled to the iron core. It may be understood that, because the first current sampling circuit uses a circuit structure with one primary winding and one secondary winding, the circuit costs of the power converter and a circuit size of the power converter can be effectively reduced.

With reference to the first aspect or the first possible implementation of the first aspect, in a second possible implementation, the controller is configured to obtain the inductive current of the output inductor when both the second-phase bridge arm and the third-phase bridge arm are in a working state, and obtain the output current of the power converter based on a capacitive current of the output capacitor and the inductive current. It may be understood that, the power converter may calculate the output current of the power converter based on the inductive current of the output inductor and the capacitive current of the output capacitor. As a result, one current sampling circuit of the output current is saved, to reduce the circuit costs of the power converter and the PCB area of the power converter.

With reference to the second possible implementation of the first aspect, in a third possible implementation, the power converter further includes a first switch and a second switch. The first input end of the power converter is connected to the midpoint of the first-phase bridge arm through the first switch. The other end of the output capacitor is connected to the first output end of the power converter through the second switch. The controller is further configured to, before both the second-phase bridge arm and the third-phase bridge arm are in the working state, control the first switch to be off and the second switch to be on. It may be understood that, when both the second-phase bridge arm and the third-phase bridge arm are in the working state, the second switch is controlled to be on, to ensure that the inductive current of the output inductor collected by the first current sampling circuit includes the output current of the power converter. Therefore, accuracy of the subsequently-calculated output current of the power converter can be improved.

With reference to the first aspect or the first possible implementation of the first aspect, in a fourth possible implementation, the power converter further includes a bypass branch. Two ends of the bypass branch are connected to the first input end and the first output end of the power converter respectively. The controller is configured to obtain the inductive current of the output inductor when the bypass branch is in a working state, and determine the inductive current as the output current of the power converter. It may be understood that, when the bypass branch works, the power converter may still obtain the output current of the power converter by using the inductive current of the output inductor collected by the first current sampling circuit. Therefore, applicability is high.

With reference to the fourth possible implementation of the first aspect, in a fifth possible implementation, the power converter further includes a first switch and a second switch. The first input end of the power converter is connected to the midpoint of the first-phase bridge arm through the first switch. The other end of the output capacitor is connected to the first output end of the power converter through the second switch. The controller is further configured to, before the bypass branch is in the working state, control the first switch and the second switch to be off. It may be understood that, when the bypass branch works, both the first switch and the second switch are controlled to be off, to ensure that the inductive current of the output inductor collected by the first current sampling circuit is the output current of the power converter. Therefore, accuracy of the output current of the power converter is improved.

With reference to the first aspect or the first possible implementation of the first aspect, in a sixth possible implementation, the power converter further includes an input inductor and a second current sampling circuit. The first input end of the power converter is connected to the midpoint of the first-phase bridge arm through the input inductor. The second current sampling circuit is disposed on a connection line between the second input end of the power converter and the midpoint of the second-phase bridge arm, and is configured to collect an inductive current of the input inductor. The controller is further configured to obtain the inductive current of the input inductor when the first-phase bridge arm is in a working state. It may be understood that, the power converter may not only obtain the inductive current of the output inductor and the output current of the power converter through the first current sampling circuit, but also obtain the inductive current of the input inductor through the second current sampling circuit. The power converter has various functions.

With reference to the sixth possible implementation of the first aspect, in a seventh possible implementation, the power converter further includes a first switch and a second switch. The first input end of the power converter is connected to the midpoint of the first-phase bridge arm through the first switch and the input inductor in sequence. The other end of the output capacitor is connected to the first output end of the power converter through the second switch. The controller is further configured to, before the first-phase bridge arm is in the working state, control the first switch to be on and the second switch to be off. It may be understood that, when the first-phase bridge arm is in the working state, the first switch is controlled to be on and the second switch is controlled to be off, to ensure that a current value collected by the second current sampling circuit is the inductive current of the input inductor. Therefore, accuracy of the inductive current of the input inductor can be improved.

According to a second aspect, this application provides a method for controlling a power converter. The power converter includes an output inductor, an output capacitor, a first current sampling circuit, a first-phase bridge arm, a second-phase bridge arm, a third-phase bridge arm, and a controller. The first-phase bridge arm, the second-phase bridge arm, and the third-phase bridge arm are connected in parallel to each other. A midpoint of the first-phase bridge arm is connected to a first input end of the power converter. A midpoint of the second-phase bridge arm is connected to one end of the output capacitor and a second input end of the power converter. A midpoint of the third-phase bridge arm is connected to the other end of the output capacitor through the output inductor. The one end and the other end of the output capacitor are connected to a second output end and a first output end of the power converter respectively. Both the second input end and the second output end of the power converter are connected to a neutral line. The first current sampling circuit is disposed on a connection line between the midpoint of the second-phase bridge arm and the one end of the output capacitor, and is configured to collect an inductive current of the output inductor. The method includes obtaining the inductive current of the output inductor, and obtaining an output current of the power converter based on the inductive current.

With reference to the second aspect, in a first possible implementation, the first current sampling circuit includes a primary winding, a secondary winding, and an iron core. One end and the other end of the primary winding are connected to the midpoint of the second-phase bridge arm and the one end of the output capacitor respectively. Both the primary winding and the secondary winding are coupled to the iron core.

With reference to the second aspect or the first possible implementation of the second aspect, in a second possible implementation, obtaining the inductive current of the output inductor, and obtaining an output current of the power converter based on the inductive current includes obtaining the inductive current of the output inductor when both the second-phase bridge arm and the third-phase bridge arm are in a working state, and obtaining the output current of the power converter based on a capacitive current of the output capacitor and the inductive current.

With reference to the second possible implementation of the second aspect, in a third possible implementation, the power converter further includes a first switch and a second switch. The first input end of the power converter is connected to the midpoint of the first-phase bridge arm through the first switch. The other end of the output capacitor is connected to the first output end of the power converter through the second switch. The method further includes, before both the second-phase bridge arm and the third-phase bridge arm are in the working state, controlling the first switch to be off and the second switch to be on.

With reference to the second aspect or the first possible implementation of the second aspect, in a fourth possible implementation, the power converter further includes a bypass branch, and two ends of the bypass branch are connected to the first input end and the first output end of the power converter respectively. The method further includes obtaining the inductive current of the output inductor when the bypass branch is in a working state, and determines the inductive current as the output current of the power converter.

With reference to the fourth possible implementation of the second aspect, in a fifth possible implementation, the power converter further includes a first switch and a second switch. The first input end of the power converter is connected to the midpoint of the first-phase bridge arm through the first switch. The other end of the output capacitor is connected to the first output end of the power converter through the second switch. The method further includes, before the bypass branch is in the working state, controlling the first switch and the second switch to be off.

With reference to the second aspect or the first possible implementation of the second aspect, in a sixth possible implementation, the power converter further includes an input inductor and a second current sampling circuit. The first input end of the power converter is connected to the midpoint of the first-phase bridge arm through the input inductor. The second current sampling circuit is disposed on a connection line between the second input end of the power converter and the midpoint of the second-phase bridge arm, and is configured to collect an inductive current of the input inductor. The method further includes obtaining the inductive current of the input inductor when the first-phase bridge arm is in a working state.

With reference to the sixth possible implementation of the second aspect, in a seventh possible implementation, the power converter further includes a first switch and a second switch. The first input end of the power converter is connected to the midpoint of the first-phase bridge arm through the first switch and the input inductor in sequence. The other end of the output capacitor is connected to the first output end of the power converter through the second switch. The method further includes, before the first-phase bridge arm is in the working state, controlling the first switch to be on and the second switch to be off.

It should be understood that mutual reference may be made to the implementations and beneficial effects of the foregoing aspects of this application.

DESCRIPTION OF EMBODIMENTS

A power converter according to this application can be used in a device that has a three-phase bridge arm topology, such as an inverter, an uninterruptible power supply (UPS), and can be used in different application scenarios, such as a photovoltaic power supply scenario, an energy storage power supply scenario, a UPS power supply scenario, and the like. The following uses the UPS power supply scenario as an example for description.

Figure 1:
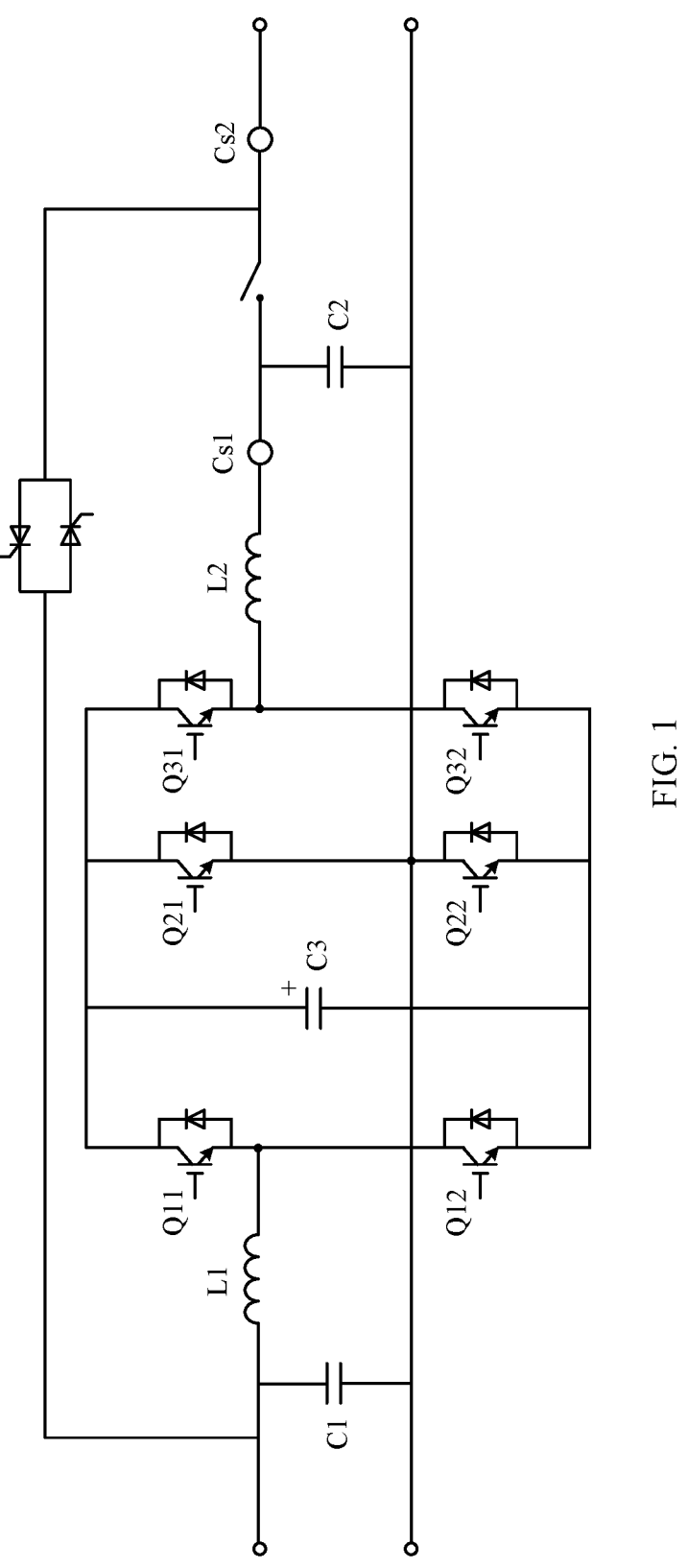
FIG. 1 is a schematic diagram of a structure of an inverter.
Figure 2:
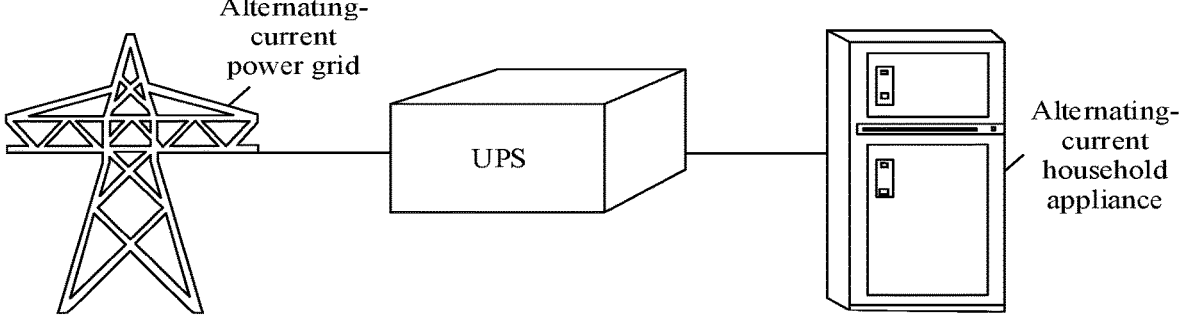
FIG. 2 is a schematic diagram of an application scenario of a power converter according to this application.

FIG. 2 is a schematic diagram of an application scenario of a power converter according to this application. In a UPS power supply scenario, the power converter according to this application may be a UPS shown in FIG. 2. An input end and an output end of the UPS are connected to an alternating-current power grid and an alternating-current household appliance respectively. The UPS includes an output inductor and an output inductive current sampling circuit. After the UPS starts to operate, the UPS may collect an inductive current of the output inductor through the output inductive current sampling circuit, and calculate a present output current of the UPS based on the inductive current of the output inductor. Then, the UPS controls a three-phase bridge arm in the UPS based on the inductive current of the output inductor and the present output current of the UPS, to convert an alternating-current power grid voltage that is input from the input end of the UPS into an alternating current that meets a power requirement of the alternating-current household appliance. As a result, power is supplied to various types of electric devices such as an alternating-current load (for example, the household appliance) and the like. The UPS may obtain the output inductive current and an output current of the UPS through the output inductive current sampling circuit. As a result, one current sampling circuit for the output current can be saved, to reduce circuit costs of the UPS and a PCB area of the UPS. The foregoing is merely an example of the application scenario of the power converter according to this application, and is not exhaustive. The application scenarios are not limited in this application.

The following describes a working principle of a power converter according to this application with reference to FIG. 3 to FIG. 8B by using examples.

Figure 3:
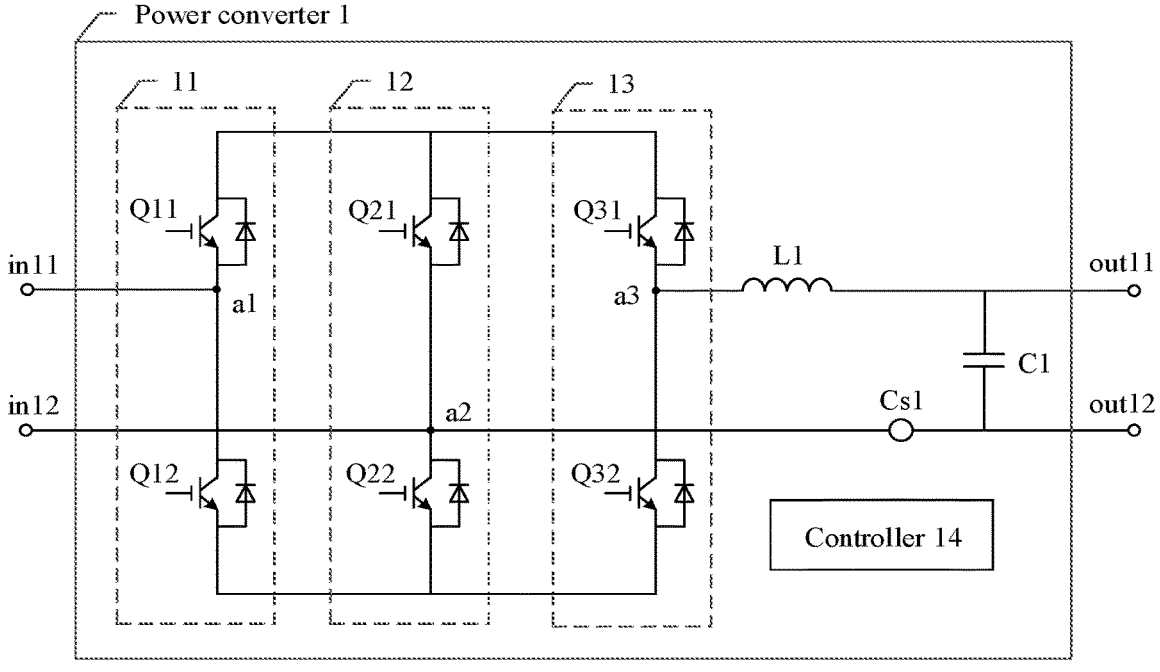
FIG. 3 is a schematic diagram of a structure of a power converter according to this application.

FIG. 3 is a schematic diagram of a structure of a power converter according to this application. As shown in FIG. 3, a power converter 1 includes an output inductor L1, an output capacitor C1, a first current sampling circuit Cs1, a first-phase bridge arm 11, a second-phase bridge arm 12, a third-phase bridge arm 13, and a controller 14. A switching transistor Q11 and a switching transistor Q12 are connected in series to form the first-phase bridge arm 11. A switching transistor Q21 and a switching transistor Q22 are connected in series to form the second-phase bridge arm 12. A switching transistor Q31 and a switching transistor Q32 are connected in series to form the third-phase bridge arm 13. The first-phase bridge arm 11, the second-phase bridge arm 12, and the third-phase bridge arm 13 are connected in parallel to each other. A midpoint a1 of the first-phase bridge arm 11, namely, a point at which the switching transistor Q11 and the switching transistor Q12 are connected in series, is connected to a first input end in11 of the power converter 1. A midpoint a2 of the second-phase bridge arm 12, namely, a point at which the switching transistor Q21 and the switching transistor Q22 are connected in series, is connected to one end of the output capacitor C1 and a second input end in12 of the power converter 1. A midpoint a3 of the third-phase bridge arm 13, namely, a point at which the switching transistor Q31 and the switching transistor Q32 are connected in series, is connected to the other end of the output capacitor C1 through the output inductor L1. The one end and the other end of the output capacitor C1 are connected to a second output end out12 and a first output end out11 of the power converter 1 respectively. Both the second input end in12 and the second output end out12 of the power converter 1 are connected to a neutral line. The first current sampling circuit Cs1 is disposed on a connection line between the midpoint a2 of the second-phase bridge arm 12 and the one end of the output capacitor C1, and is configured to collect an inductive current of the output inductor L1.

It should be noted that a type of the switching transistor in the three-phase bridge arm may be a metal-oxide-semiconductor field-effect transistor (MOSFET), an insulated-gate bipolar transistor (IGBT), a gallium nitride (GaN) transistor, or the like. This is not limited in this application.

In an optional implementation, after the power converter 1 starts to work, the controller 14 obtains the inductive current of the output inductor L1 through the first current sampling circuit Cs1, and obtains an output current of the power converter 1 based on the inductive current of the output inductor L1.

In this embodiment of this application, the power converter 1 may obtain the inductive current of the output inductor L1 and the output current of the power converter 1 through the first current sampling circuit Cs1. As a result, one current sampling circuit for collecting the output current can be saved, to reduce circuit costs of the power converter 1 and a PCB area of the power converter 1.

Figure 4A:
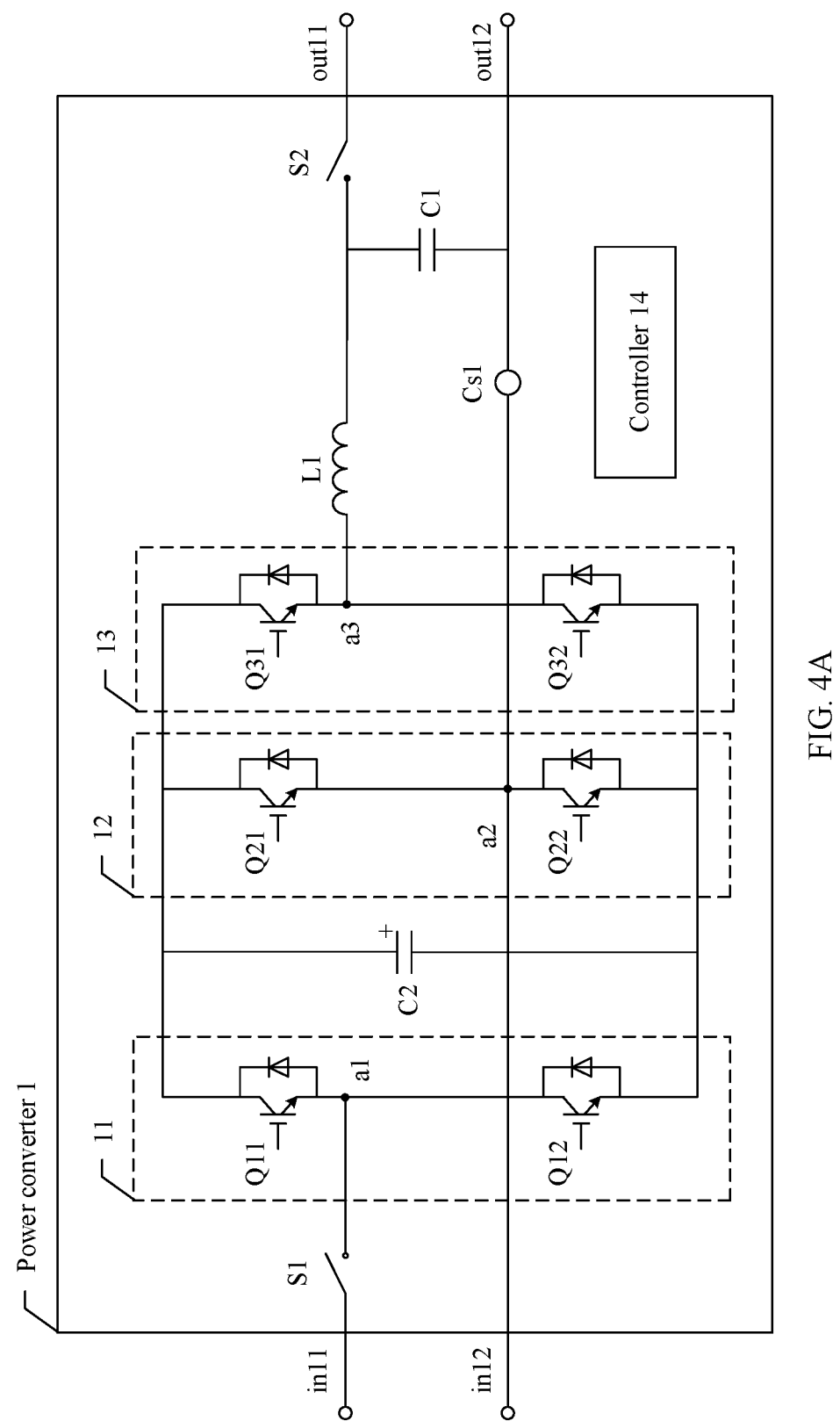
FIG. 4A is a schematic diagram of another structure of a power converter according to this application.

FIG. 4A is a schematic diagram of another structure of a power converter according to this application. As shown in FIG. 4A, a power converter 1 includes an output inductor L1, an output capacitor C1, a first current sampling circuit Cs1, a first-phase bridge arm 11, a second-phase bridge arm 12, a third-phase bridge arm 13, a controller 14, a bus capacitor C2, a first switch S1, and a second switch S2. The bus capacitor C2 is connected in parallel to two ends of the first-phase bridge arm 11. A first input end in11 of the power converter 1 is connected to a midpoint a1 of the first-phase bridge arm 11 through the first switch S1. The other end of the output capacitor C1 is connected to a first output end out11 of the power converter 1 through the second switch S2. For specific connection relationships of circuit elements in the power converter 1 other than the bus capacitor C2, the first switch S1, and the second switch S2, refer to corresponding descriptions of the power converter 1 shown in FIG. 3. Details are not described herein again. It should be noted that, both the first input end in11 and the first output end out11 of the power converter 1 are connected to a live line, and both a second input end in12 and a second output end out12 of the power converter 1 are connected to a same neutral line. On this basis, it may be learned that the first current sampling circuit Cs1 is located on the neutral line.

Figure 4B:
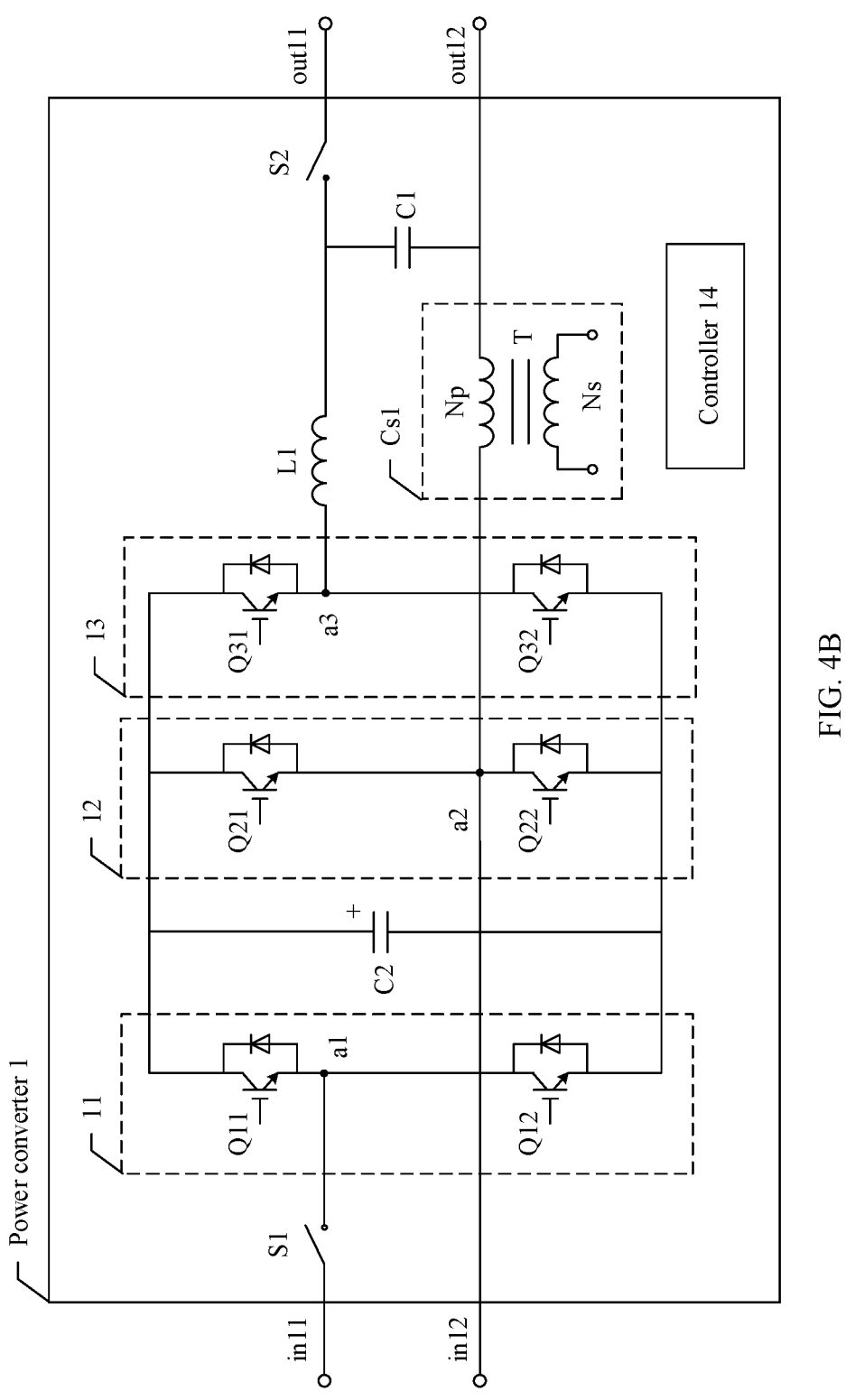
FIG. 4B is a schematic diagram of still another structure of a power converter according to this application.

The first current sampling circuit Cs1 may use a circuit structure with a primary winding and a secondary winding. For details, refer to a power converter 1 shown in FIG. 4B. As shown in FIG. 4B, the first current sampling circuit Cs1 includes a primary winding Np, a secondary winding Ns, and an iron core T. One end and the other end of the primary winding Np are connected to a midpoint a2 of the second-phase bridge arm 12 and one end of the output capacitor C1 respectively. Both the primary winding Np and the secondary winding Ns are coupled to the iron core T.

In an optional implementation, after an alternating-current voltage is applied to the first input end in11 and the second input end in12 of the power converter 1, the controller 14 controls the first switch S1 to be in an on state and the second switch S2 to be in an off state. After the first switch S1 is in the on state and the second switch S2 is in the off state, the controller 14 controls the first-phase bridge arm 11 to be in a working state, so that the bus capacitor C2 is in a charging state. Then, after a voltage of the bus capacitor C2 reaches a first voltage, the controller 14 controls the first-phase bridge arm 11 to stop working, and controls the first switch S1 to be in an off state. For a specific implementation in which the first-phase bridge arm 11 is in the working state, refer to descriptions in subsequent embodiments. Details are not described herein.

Figure 5A:
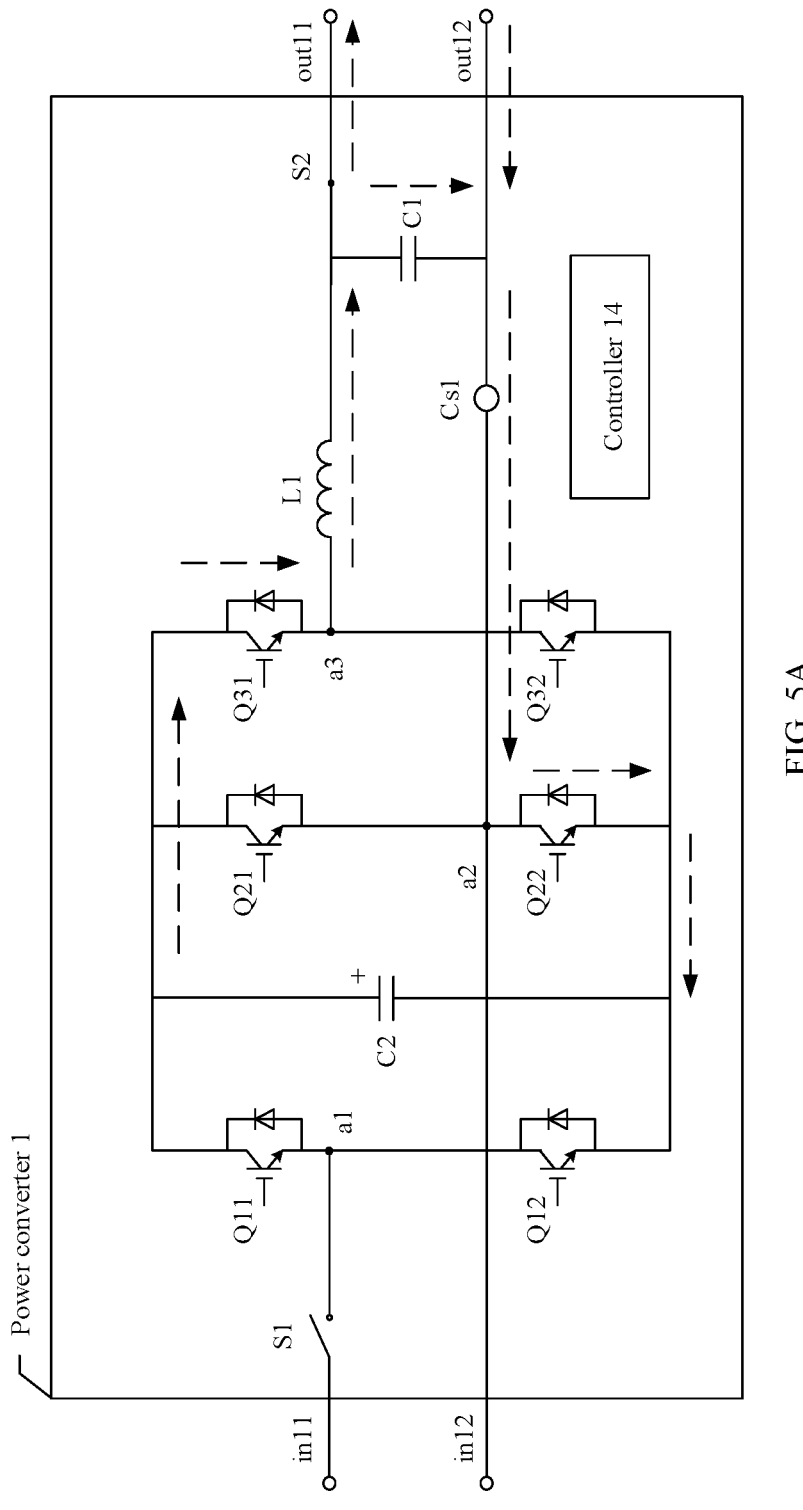
FIG. 5A is a diagram of a working principle of a power converter according to this application.
Figure 5B:
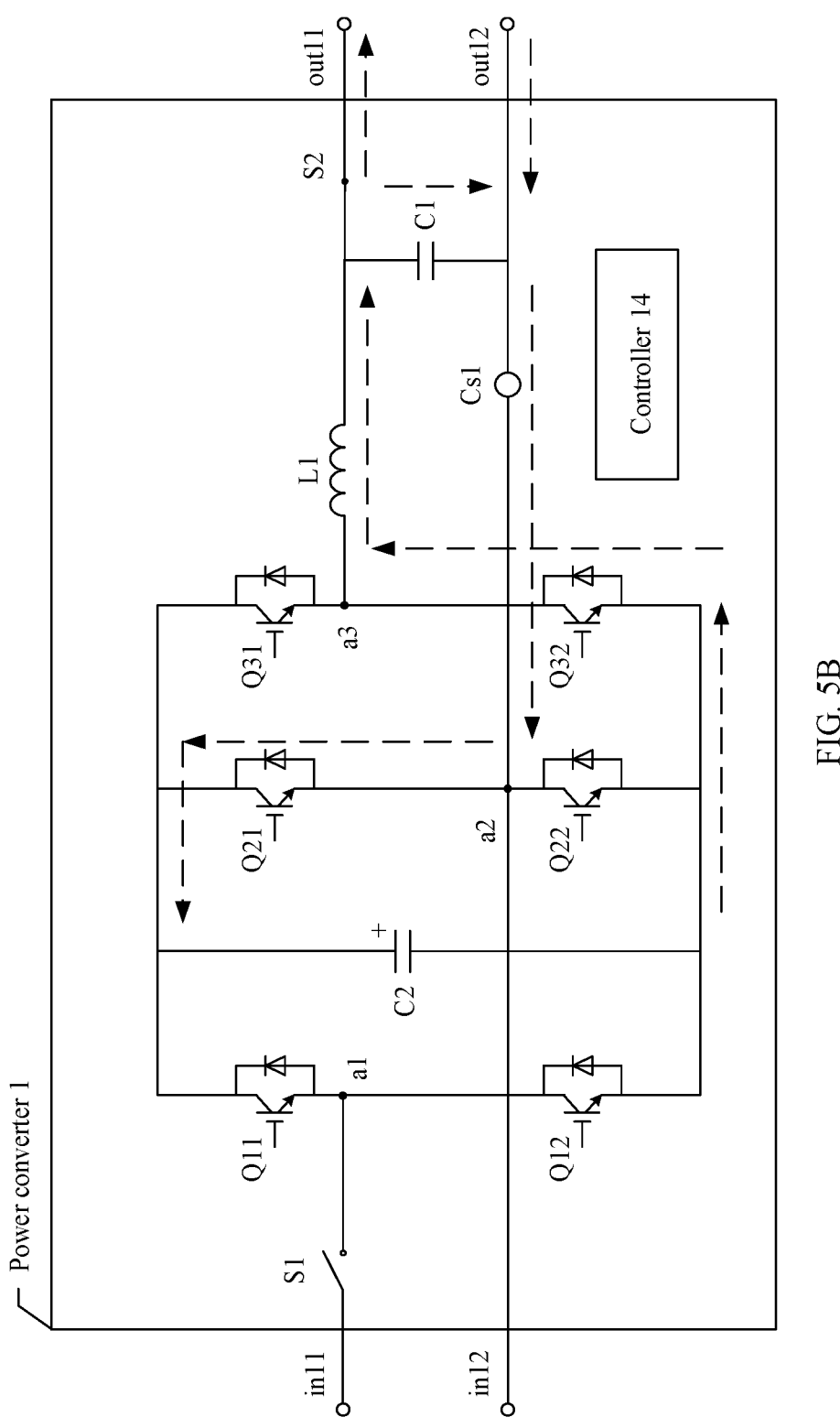
FIG. 5B is a diagram of another working principle of a power converter according to this application.

Then, the controller 14 controls the second switch S2 to be on. After the first switch S1 is in the off state and the second switch S2 is in an on state, the controller 14 controls two switching transistors located diagonally in the second-phase bridge arm 12 and the third-phase bridge arm 13 to be both on, and two switching transistors in each of the second-phase bridge arm 12 and the third-phase bridge arm 13 to be complementarily on, so that both the second-phase bridge arm 12 and the third-phase bridge arm 13 are in a working state. Further, the controller 14 controls a switching transistor Q21 to be off, a switching transistor Q22 to be on, a switching transistor Q31 to be on, and a switching transistor Q32 to be off for first preset duration. In the first preset duration, the output inductor L1 is in a charging state. As shown in FIG. 5A, a current flows out of the bus capacitor C2 and passes through the switching transistor Q31 and the output inductor L1 in sequence. After the current passes through the output inductor L1, one part of the current flows through the output capacitor C1, and the other part of the current flows through an alternating-current load connected to the output end of the power converter 1. Then, both the two parts of the current flow through the first current sampling circuit Cs1 and the switching transistor Q22 in sequence, and subsequently flow into the bus capacitor C2. After the switching transistors Q31 and Q22 are on and the switching transistors Q21 and Q32 are off for the first preset duration, the controller 14 controls the switching transistor Q21 to be on, the switching transistor Q22 to be off, the switching transistor Q31 to be off, and the switching transistor Q32 to be on for second preset duration. In the second preset duration, the output inductor L1 is in a discharging state. As shown in FIG. 5B, because a direction of the inductive current cannot abruptly change, after a current flows out of the output inductor L1, one part of the current flows through the output capacitor C1, and the other part of the current flows through the alternating-current load connected to the output end of the power converter 1. Then, both the two parts of the current flow through the first current sampling circuit Cs1, a parasitic diode of the switching transistor Q21, the bus capacitor C2, and a parasitic diode of the switching transistor Q32 in sequence, and subsequently flow into the output inductor L1. The first preset duration and the second preset duration form a working period of the second-phase bridge arm 12 and the third-phase bridge arm 13. In the working period, both the second-phase bridge arm 12 and the third-phase bridge arm 13 are in the working state.

When both the second-phase bridge arm 12 and the third-phase bridge arm 13 are in the working state, the controller 14 sends a current obtaining instruction to the first current sampling circuit Cs1. The first current sampling circuit Cs1 sends a current at two ends of the secondary winding Ns, that is, the inductive current of the output inductor L1, to the controller 14 according to the received current obtaining instruction. When both the second-phase bridge arm 12 and the third-phase bridge arm 13 are in the working state, and the first switch S1 is off and the second switch S2 is on, one part of the current flowing out of the output inductor L1 flows through the output capacitor C1, and the other part of the current flows through the alternating-current load connected to the output end of the power converter 1. Therefore, the inductive current of the output inductor L1 collected by the first current sampling circuit Cs1 includes two parts: a capacitive current of the output capacitor C1 and an output current of the power converter 1. The controller 14 obtains a voltage of the output capacitor C1, and calculates the capacitive current of the output capacitor C1 based on the voltage of the output capacitor C1, to calculate the output current of the power converter 1 by subtracting the capacitive current of the output capacitor C1 from the inductive current of the output inductor L1 collected by the first current sampling circuit Cs1.

In this embodiment of this application, the power converter 1 may obtain the inductive current of the output inductor L1 through the first current sampling circuit Cs1, and calculate the output current of the power converter 1 based on the inductive current of the output inductor L1 and the capacitive current of the output capacitor C1. As a result, one current sampling circuit for collecting the output current can be saved, to reduce circuit costs of the power converter 1 and a PCB area of the power converter 1.

Figure 6:
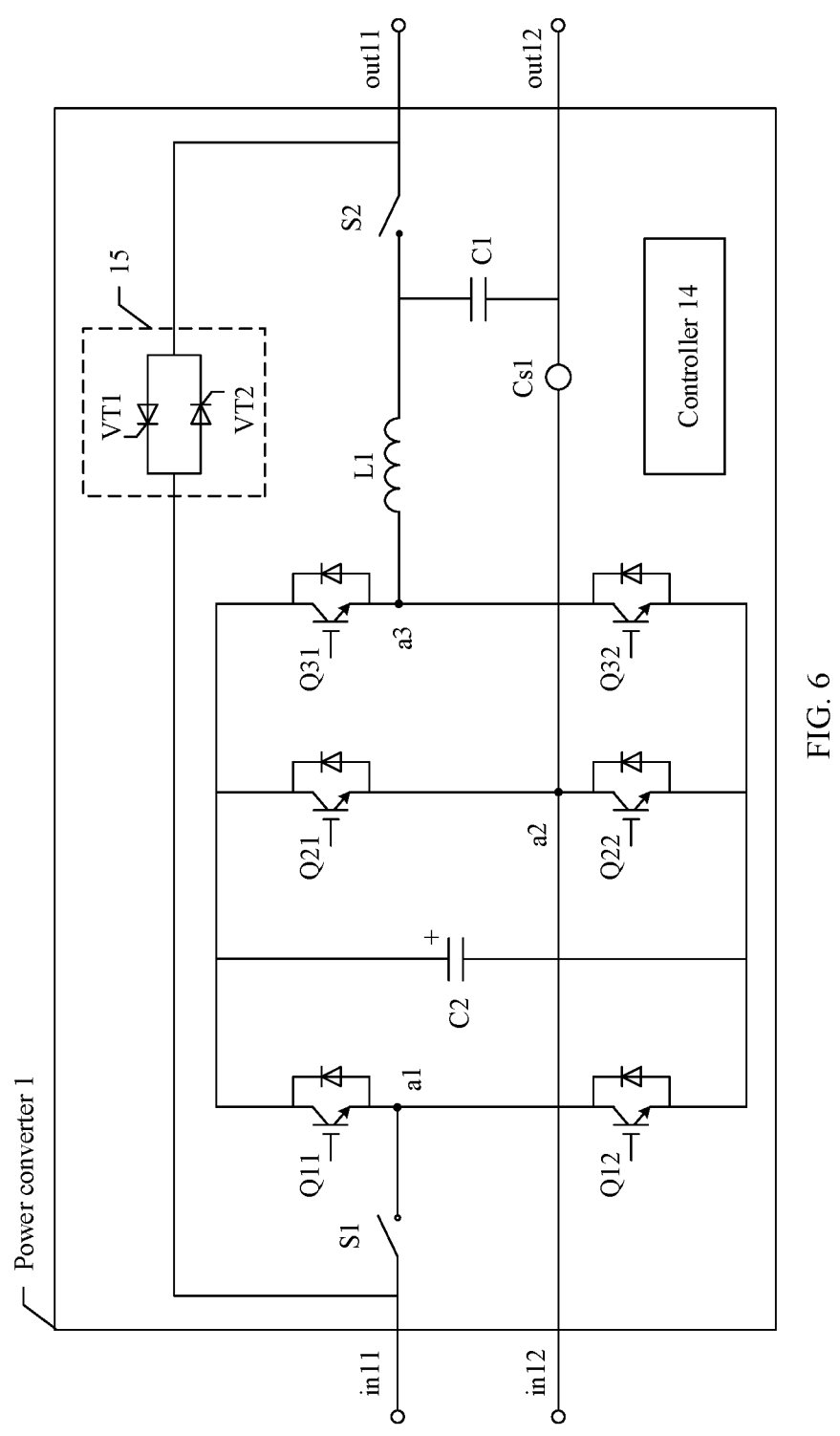
FIG. 6 is a schematic diagram of yet another structure of a power converter according to this application.

FIG. 6 is a schematic diagram of yet another structure of a power converter according to this application. As shown in FIG. 6, compared with the power converter 1 shown in FIG. 4A, a power converter 1 shown in FIG. 6 has an additional bypass branch 15. The bypass branch 15 includes reverse blocking triode thyristors VT1 and VT2. A cathode of the reverse blocking triode thyristor VT1 is connected to an anode of the reverse blocking triode thyristor VT2 to form one end of the bypass branch 15. An anode of the reverse blocking triode thyristor VT1 is connected to a cathode of the reverse blocking triode thyristor VT2 to form the other end of the bypass branch 15. The one end and the other end of the bypass branch 15 are connected to a first input end in11 and a first output end out11 of the power converter 1 respectively. For circuit elements other than the bypass branch 15 and connection relationships between the circuit elements other than the bypass branch 15, refer to descriptions of the power converter 1 shown in FIG. 4A and FIG. 4B. Details are not described herein again.

In addition to an inversion mode, the power converter 1 may further work in a bypass mode. In this embodiment, a specific implementation of determining an output current of the power converter 1 when the power converter 1 works in the inversion mode is not described again. For details, refer to a corresponding description of the power converter 1 shown in FIG. 4A. That the power converter 1 works in the inversion mode means that both a second-phase bridge arm 12 and a third-phase bridge arm 13 are in a working state, and a first switch S1 is in an off state and a second switch S2 is in an on state.

In an optional implementation, a controller 14 controls the first switch S1 and the second switch S2 to be both off, and controls the reverse blocking triode thyristor VT2 to be conducted, so that the power converter 1 is in the bypass mode. When the power converter 1 is in the bypass mode, a current flows in from the first input end in11 of the power converter 1, then flows through the reverse blocking triode thyristor VT2, the first output end out11 of the power converter 1, an alternating-current load connected to the power converter 1, a second output end out12 of the power converter 1, and a first current sampling circuit Cs1 in sequence, and flows into a second input end in12 of the power converter 1.

After the power converter 1 is in the bypass mode, a controller 14 sends a current obtaining instruction to the first current sampling circuit Cs1. The first current sampling circuit Cs1 sends a current at two ends of a secondary winding Ns, that is, a collected inductive current of an output inductor L1, to the controller 14 according to the received current obtaining instruction. When the power converter 1 is in the bypass mode, the current flowing out of the output inductor L1 passes through only the alternating-current load connected to the output end of the power converter 1. Therefore, the controller 14 determines the obtained inductive current of the output inductor L1 as the output current of the power converter 1, where the inductive current of the output inductor L1 is collected by the first current sampling circuit Cs1.

In this embodiment of this application, the power converter 1 may obtain the inductive current of the output inductor L1 through the first current sampling circuit Cs1, and calculate the output current of the power converter 1 based on the inductive current of the output inductor L1 and a capacitive current of an output capacitor C1. As a result, one current sampling circuit for collecting the output current can be saved, to reduce circuit costs of the power converter 1 and a PCB area of the power converter 1.

Figure 7:
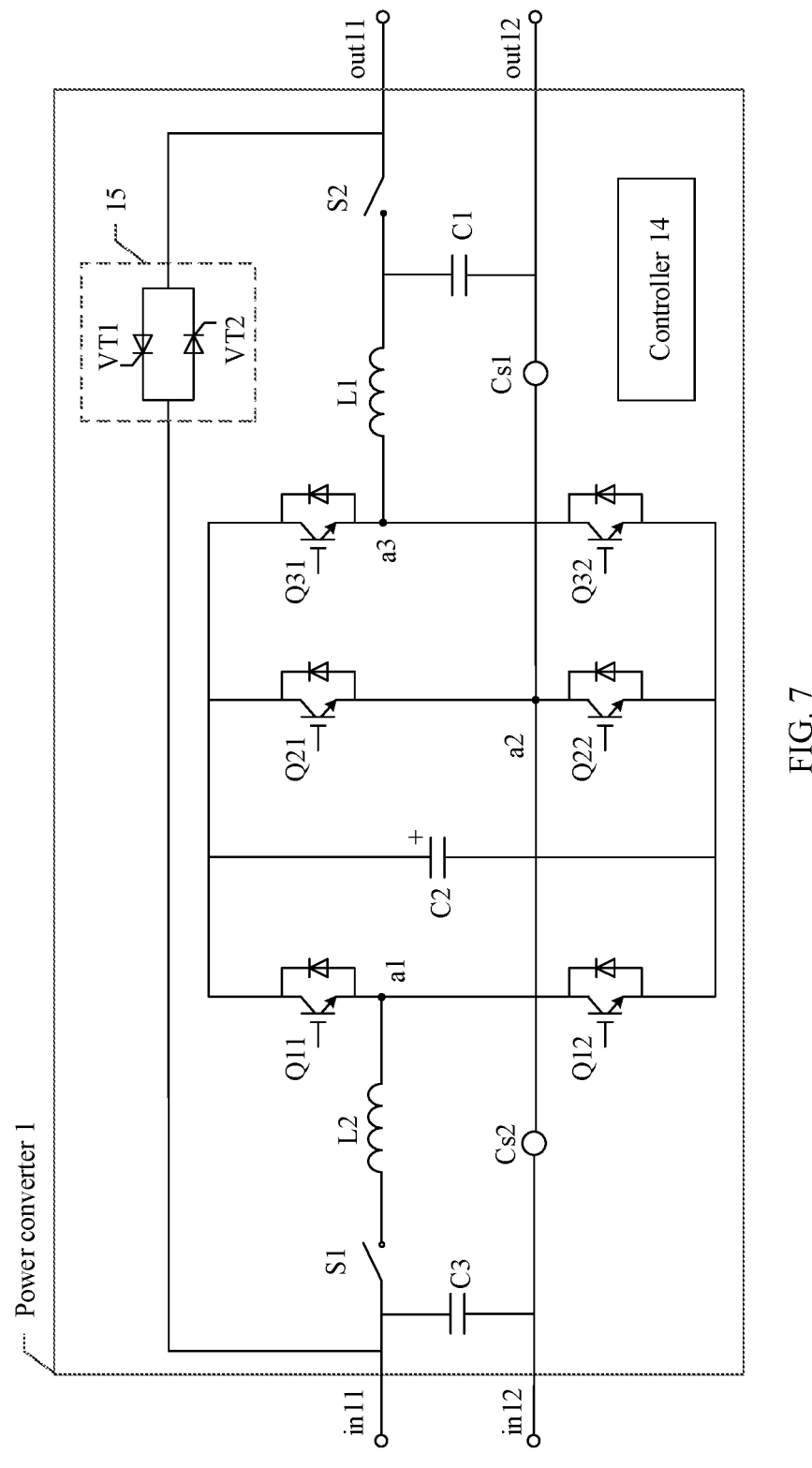
FIG. 7 is a schematic diagram of still yet another structure of a power converter according to this application.

FIG. 7 is a schematic diagram of still yet another structure of a power converter according to this application. As shown in FIG. 7, compared with the power converter 1 shown in FIG. 6, a power converter 1 shown in FIG. 7 has an additional input inductor L2, an additional input capacitor C3, and an additional second current sampling circuit Cs2. A first input end in11 of the power converter 1 is connected to a midpoint a1 of a first-phase bridge arm 11 through a first switch S1 and the input inductor L2 in sequence. Two ends of the input capacitor C3 are connected to the first input end in11 and a second input end in12 of the power converter 1 respectively. The second current sampling circuit Cs2 is disposed on a connection line between the second input end in12 of the power converter 1 and a midpoint a2 of a second-phase bridge arm 12, and is configured to collect an inductive current of the input inductor L2. For circuit elements other than the input inductor L2, the input capacitor C3, and the second current sampling circuit Cs2, and connection relationships between the circuit elements other than the input inductor L2, the input capacitor C3, and the second current sampling circuit Cs2, refer to descriptions of the power converter 1 shown in FIG. 6. Details are not described herein again.

The second current sampling circuit Cs2 may use a current sensor that has a circuit structure the same as that of a first current sampling circuit Cs1, namely, a current sensor that has a primary winding and a secondary winding, or may use a current sensor that has a circuit structure different from that of a first current sampling circuit Cs1. This is not limited in this application.

Figure 8A:
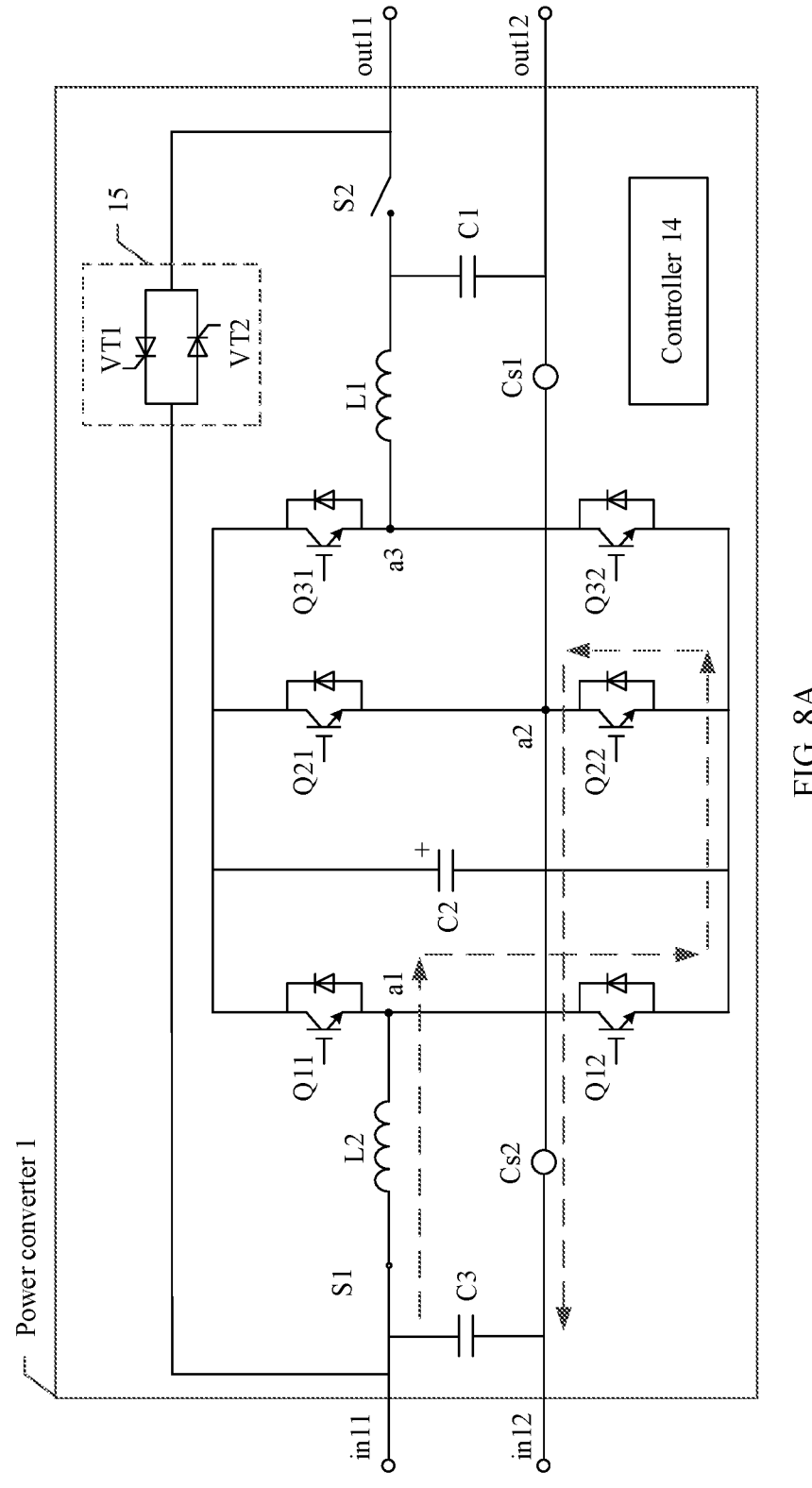
FIG. 8A is a diagram of a working principle of a power converter according to this application.
Figure 8B:
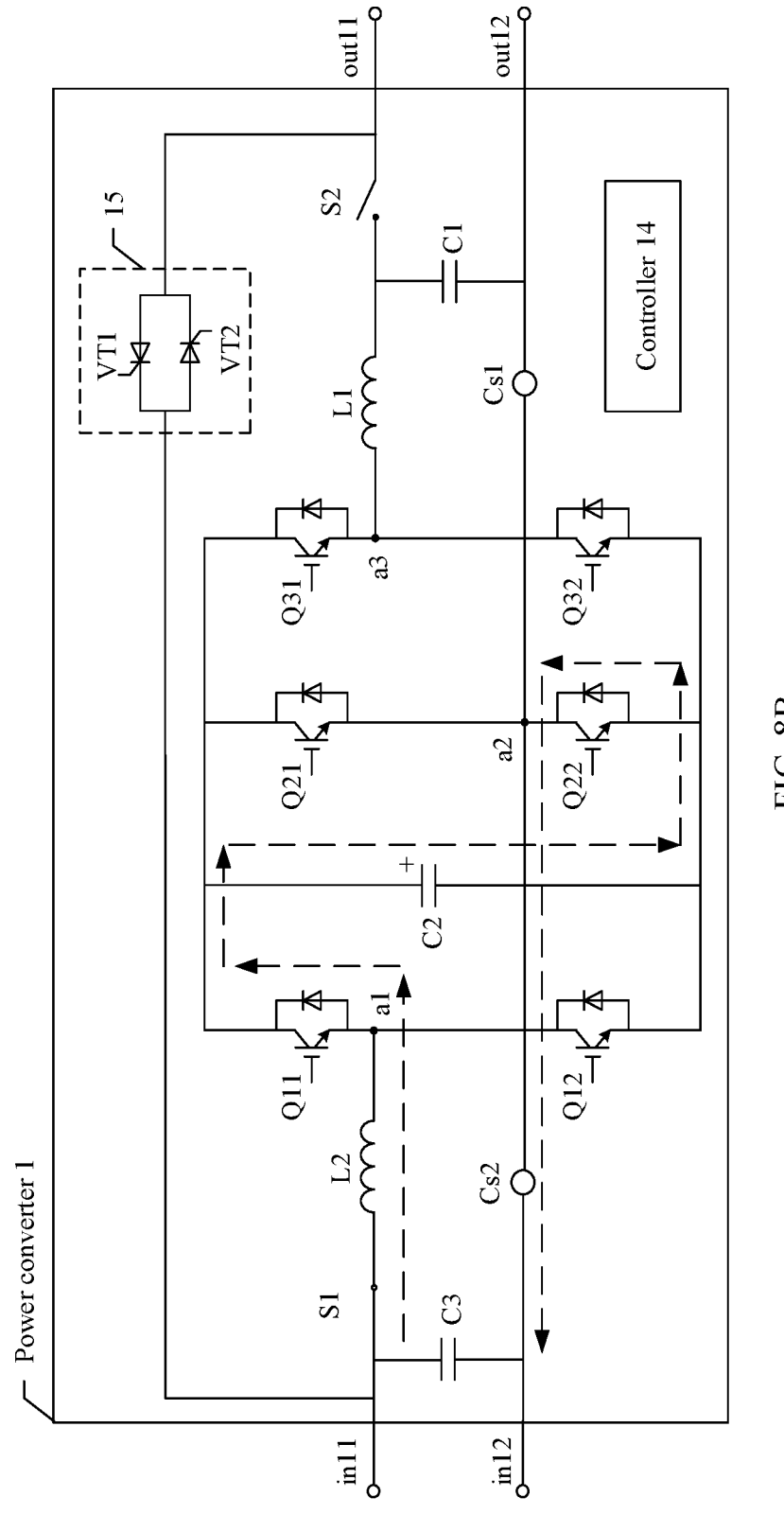
FIG. 8B is a diagram of another working principle of a power converter according to this application.

In an optional implementation, after an alternating-current voltage is applied to the first input end in11 and the second input end in12 of the power converter 1, a controller 14 controls the first switch S1 to be in an on state and a second switch S2 to be in an off state. After the first switch S1 is in the on state and the second switch S2 is in the off state, the controller 14 controls switching transistors Q11 and Q12 of the first-phase bridge arm 11 to be complementarily connected, so that the first-phase bridge arm 11 is in a working state. Further, the controller 14 controls the switching transistor Q12 to be on for third preset duration. In the third preset duration, the input inductor L2 is in a charging state. As shown in FIG. 8A, after a current flows in from the first input end in11 of the power converter 1, one part of the current flows through the input inductor L2, and the other part of the current flows through the input capacitor C3. After flowing out of the input inductor L2, the one part of the current that flows through the input inductor L2 flows through the switching transistor Q12, a parasitic capacitor of a switching transistor Q22, and the second current sampling circuit Cs2 in sequence, and subsequently flows into the second input end in12 of the power converter 1. After the switching transistor Q22 is on for the third preset duration, the controller 14 controls the switching transistor Q11 to be on for fourth preset duration. In the fourth preset duration, the input inductor L2 is in a discharging state. Further, the input inductor L2 discharges power to a bus capacitor C2. As shown in FIG. 8B, because a direction of the inductive current cannot abruptly change, after a current flows out of the input inductor L2, the current flows through a parasitic diode of the switching transistor Q11, the bus capacitor C2, the parasitic diode of the switching transistor Q22, and the second current sampling circuit Cs2 in sequence, and subsequently flows into the second input end in12 of the power converter 1. The third preset duration and the fourth preset duration form a working period of the first-phase bridge arm 11. In the working period, the first-phase bridge arm 11 is in the working state.

When the first-phase bridge arm 11 is in the working state, the controller 14 sends a current obtaining instruction to the second current sampling circuit Cs2. The second current sampling circuit Cs2 starts to collect the inductive current of the input inductor L2, and sends the collected inductive current of the input inductor L2 to the controller 14, according to the received current obtaining instruction. When the first-phase bridge arm 11 is in the working state, and the first switch S1 is on and the second switch S2 is off, a current flowing through the second current sampling circuit Cs2 is the current of the input inductor L2. Therefore, a current value collected by the second current sampling circuit Cs2 is the inductive current of the input inductor L2.

Then, after a voltage of the bus capacitor C2 reaches a first voltage, the controller 14 controls the first-phase bridge arm 11 to stop working, and controls the first switch S1 to be off. After the first-phase bridge arm 11 stops working and the first switch S1 is in an off state, the controller 14 controls the second switch S2 to be on. After the first switch S1 is in the off state and the second switch S2 are in an on state, the controller 14 controls both the second-phase bridge arm 12 and the third-phase bridge arm 13 to be in a working state. When both the second-phase bridge arm 12 and the third-phase bridge arm 13 are in the working state, the controller 14 sends a current obtaining instruction to the first current sampling circuit Cs1. The first current sampling circuit Cs1 starts to collect an inductive current of an output inductor L1 and sends the inductive current of the output inductor L1 to the controller 14, according to the received current obtaining instruction. The controller 14 obtains a voltage of an output capacitor C1, and calculates a capacitive current of the output capacitor C1 based on the voltage of the output capacitor C1, to calculate an output current of the power converter 1 by subtracting the capacitive current of the output capacitor C1 from the inductive current of the output inductor L1 collected by the first current sampling circuit Cs1.

In addition, when the power converter 1 is in a bypass mode, that is, both the first switch S1 and the second switch S2 are off, and a reverse blocking triode thyristor VT1 or a reverse blocking triode thyristor VT2 is conducted, the power converter 1 may obtain the output current of the power converter 1 through the first current sampling circuit Cs1. For a specific implementation of obtaining the output current of the power converter 1 when the power converter 1 is in the bypass mode, refer to corresponding descriptions of the power converter 1 shown in FIG. 6. Details are not described herein again.

In this embodiment of this application, the power converter 1 may obtain the inductive current of the output inductor L1 through the first current sampling circuit Cs1, and calculate the output current of the power converter 1 based on the inductive current of the output inductor L1 and the capacitive current of the output capacitor C1. As a result, one current sampling circuit for collecting the output current can be saved, to reduce circuit costs of the power converter 1 and a PCB area of the power converter 1.

Figure 9:
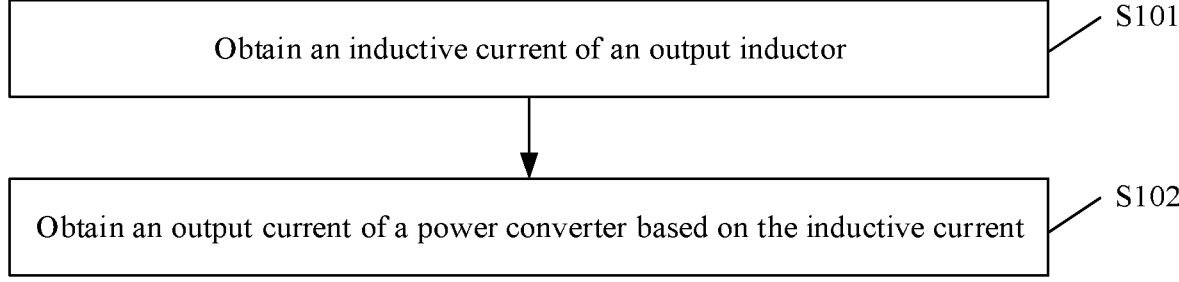
FIG. 9 is a schematic flowchart of a method for controlling a power converter according to this application.

FIG. 9 is a schematic flowchart of a method for controlling a power converter according to this application. The method for controlling a power converter according to this embodiment of this application is applicable to the controller 14 in the power converter 1 shown in FIG. 3 to FIG. 8B. The method for controlling a power converter may include the following steps.

S101: Obtain an inductive current of an output inductor.

In an optional implementation, when both a second-phase bridge arm and a third-phase bridge arm are in a working state, a controller in the power converter obtains the inductive current of the output inductor.

In another optional implementation, when a bypass branch is in a working state, a controller in the power converter obtains the inductive current of the output inductor.

S102: Obtain an output current of the power converter based on the inductive current.

In an optional implementation, the controller in the power converter obtains the output current of the power converter based on a capacitive current of an output capacitor and the inductive current of the output inductor, where the inductive current of the output inductor is obtained when both the second-phase bridge arm and the third-phase bridge arm are in the working state.

In another optional implementation, the controller in the power converter determines the inductive current of the output inductor as the output current of the power converter, where the inductive current of the output inductor is obtained when the bypass branch is in the working state.

In specific implementation, for more operations performed by the controller in the method for controlling a power converter according to this application, refer to the implementations performed by the controller 14 in the power converter 1 shown in FIG. 3 to FIG. 8B. Details are not described herein again.

In this embodiment of this application, the power converter may obtain the inductive current of the output inductor through a first current sampling circuit, and calculate the output current of the power converter based on the inductive current of the output inductor and the capacitive current of the output capacitor. As a result, one current sampling circuit for collecting the output current can be saved, to reduce circuit costs of the power converter and a PCB area of the power converter.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power converter comprising:
   a power converter first input end;
   a power converter second input end configured to couple to a neutral line;
   a power converter first output end;
   a power converter second output end configured to couple to the neutral line;
   an output inductor comprising:
      an output inductor first end; and
      an output inductor second end;
   an output capacitor comprising:
      an output capacitor first end coupled to the power converter first output end; and
      an output capacitor second end coupled to the power converter second output end;

a first-phase bridge arm comprising a first midpoint coupled to the power converter first input end;

a first switch, wherein the power converter first input end is coupled to the first midpoint through the first switch;

a second-phase bridge arm comprising a second midpoint coupled to the output capacitor second end and the power converter second input end;

a second switch, wherein the output capacitor first end is coupled to the power converter first output end through the second switch;

a third-phase bridge arm comprising a third midpoint coupled to the output capacitor first end through the output inductor, wherein the first-phase bridge arm, the second-phase bridge arm, and the third-phase bridge arm are coupled in parallel to each other;

a current sampling circuit disposed on a connection line between the second midpoint and the output capacitor second end and configured to collect an inductive current of the output inductor; and a controller communicatively coupled to the current sampling circuit and configured to:

control the first switch to be off and the second switch to be on before both the second-phase bridge arm and the third-phase bridge arm are in a first working state;

obtain the inductive current from the output inductor; and obtain, based on the inductive current, an output current of the power converter.

2. The power converter of claim 1, wherein the current sampling circuit comprises:

an iron core;

a primary winding coupled to the iron core and comprising:

a primary winding first end coupled to the second midpoint; and a primary winding first second end coupled to the output capacitor second end; and a secondary winding coupled to the iron core.

3. The power converter of claim 2, wherein the controller is further configured to:

further obtain the inductive current when both the second-phase bridge arm and the third-phase bridge arm are in the first working state; and further obtain, based on a capacitive current of the output capacitor, the output current.

4. The power converter of claim 2, further comprising a bypass branch comprising:

a bypass branch first end coupled to the power converter first input end; and a bypass branch second end coupled to the power converter first output end, wherein the controller is further configured to:

obtain the inductive current when the bypass branch is in a second working state; and obtain the inductive current as the output current.

5. The power converter of claim 1, wherein the controller is further configured to:

further obtain the inductive current when both the second-phase bridge arm and the third-phase bridge arm are in the first working state; and further obtain, based on a capacitive current of the output capacitor, the output current.

6. The power converter of claim 1, further comprising a bypass branch comprising:

a bypass branch first end coupled to the power converter first input end; and a bypass branch second end coupled to the power converter first output end, wherein the controller is further configured to:

obtain the inductive current when the bypass branch is in a second working state; and determine obtain the inductive current as the output current.

7. The power converter of claim 6, wherein the controller is further configured to control the first switch and the second switch to be off before the bypass branch is in the second working state.

8. A power converter comprising:

a power converter first input end;

a first switch coupled to the power converter first input end;

a power converter second input end configured to couple to a neutral line;

a power converter first output end;

a second switch coupled to the power converter first output end;

a power converter second output end configured to couple to the neutral line;

an output inductor comprising:

an output inductor first end; and an output inductor second end;

an output capacitor comprising:

an output capacitor first end coupled to the power converter first output end; and an output capacitor second end coupled to the power converter second output end;

an input capacitor comprising:

an input capacitor first end coupled to the power converter first input end; and an input capacitor second end coupled to the power converter second input end;

an input inductor coupled to the first switch;

a first-phase bridge arm comprising a first midpoint coupled to the power converter first input end sequentially through the input inductor and the first switch;

a second-phase bridge arm comprising a second midpoint coupled to the output capacitor second end and the power converter second input end;

a third-phase bridge arm comprising a third midpoint coupled to the output capacitor first end through the output inductor, wherein the first-phase bridge arm, the second-phase bridge arm, and the third-phase bridge arm are coupled in parallel to each other;

a first current sampling circuit disposed on a first connection line between the second midpoint and the output capacitor second end and configured to collect a first inductive current of the output inductor;

a second current sampling circuit disposed on a second connection line between the power converter second input end and the second midpoint and configured to collect a second inductive current of the input inductor; and a controller communicatively coupled to the first current sampling circuit and configured to:

obtain the first inductive current;

obtain the second inductive current; and obtain, based on the first inductive current and the second inductive current, an output current of the power converter.

9. The power converter of claim 8, wherein the first current sampling circuit comprises:

an iron core;

a primary winding coupled to the iron core and compris-
ing:
a primary winding first end coupled to the second
midpoint; and
a primary winding second end coupled to the output
capacitor second end; and
a secondary winding coupled to the iron core.

10. The power converter of claim 9, wherein the controller
is further configured to:
further obtain the first inductive current when both the
second-phase bridge arm and the third-phase bridge
arm are in a working state; and
further obtain, based on a capacitive current of the output
capacitor, the output current.

11. The power converter of claim 9, further comprising a
bypass branch comprising:
a bypass branch first end coupled to the power converter
first input end; and
a bypass branch second end coupled to the power con-
verter first output end,
wherein the controller is further configured to:
obtain the first inductive current when the bypass
branch is in a working state; and
obtain the first inductive current as the output current.

12. The power converter of claim 8, wherein the power
converter first input end is coupled to the first midpoint
through the first switch, wherein the output capacitor first
end is coupled to the power converter first output end
through the second switch, and wherein the controller is
further configured to control the first switch to be off and the
second switch to be on before both the second-phase bridge
arm and the third-phase bridge arm are in a working state.

13. A power converter comprising:
a power converter first input end;
a power converter second input end configured to couple
to a neutral line;
a power converter first output end;
a power converter second output end configured to couple
to the neutral line;
an output inductor comprising:
an output inductor first end; and
an output inductor second end;
an output capacitor comprising:
an output capacitor first end coupled to the power
converter first output end; and
an output capacitor second end coupled to the power
converter second output end;
a first-phase bridge arm comprising a first midpoint
coupled to the power converter first input end;
a first switch, wherein the power converter first input end
is coupled to the first midpoint through the first switch;
a second-phase bridge arm comprising a second midpoint
coupled to the output capacitor second end and the
power converter second input end;
a second switch, wherein the output capacitor first end is
coupled to the power converter first output end through
the second switch,
a third-phase bridge arm comprising a third midpoint
coupled to the output capacitor first end through the
output inductor, wherein the first-phase bridge arm, the
second-phase bridge arm, and the third-phase bridge
arm are coupled in parallel to each other;
a current sampling circuit disposed on a connection line
between the second midpoint and the output capacitor
second end and configured to collect an inductive
current of the output inductor;
a bypass branch; and a controller communicatively coupled to the current sam-
pling circuit and configured to:
control the first switch and the second switch to be off
before the bypass branch is in a first working state;
obtain the inductive current from the output inductor;
and
obtain, based on the inductive current, an output current
of the power converter.

14. The power converter of claim 13, wherein the current
sampling circuit comprises:
an iron core;
a primary winding coupled to the iron core and compris-
ing:
a primary winding first end coupled to the second
midpoint; and
a primary winding first second end coupled to the
output capacitor second end; and
a secondary winding coupled to the iron core.

15. The power converter of claim 14, wherein the con-
troller is further configured to:
further obtain the inductive current when both the second-
phase bridge arm and the third-phase bridge arm are in
a second working state; and
further obtain, based on a capacitive current of the output
capacitor, the output current.

16. The power converter of claim 14, wherein the bypass
branch comprises:
a bypass branch first end coupled to the power converter
first input end; and
a bypass branch second end coupled to the power con-
verter first output end,
wherein the controller is further configured to:
obtain the inductive current when the bypass branch is
in the first working state; and
obtain the inductive current as the output current.

17. The power converter of claim 13, wherein the con-
troller is further configured to:
further obtain the inductive current when both the second-
phase bridge arm and the third-phase bridge arm are in
a second working state; and
further obtain, based on a capacitive current of the output
capacitor, the output current.

18. The power converter of claim 13, wherein the con-
troller is further configured to control the first switch to be
off and the second switch to be on before both the second-
phase bridge arm and the third-phase bridge arm are in a
second working state.

19. The power converter of claim 13, wherein the con-
troller is further configured to control the first switch to be
off and the second switch to be on before both the second-
phase bridge arm and the third-phase bridge arm are in a
second working state:
control the first switch to be in an on state and the second
switch to be in an off state;
control, after the first switch is in the on state and the
second switch is in the off state, the first-phase bridge
arm to be in the second working state and a bus
capacitor to be in a charging state;
control, after a voltage of the bus capacitor reaches a first
voltage, the first-phase bridge arm to stop working; and
control the first switch to be in an off state.

20. The power converter of claim 13, wherein the bypass
branch further comprises:
a bypass branch first end coupled to the power converter
first input end; and
a bypass branch second end coupled to the power con-
verter first output end, wherein the controller is further configured to:
  obtain the inductive current when the bypass branch is
    in the first working state; and
  obtain the inductive current as the output current.

* * * * *